United States Patent Office 3,279,991
Patented Oct. 18, 1966

3,279,991
PREPARATION OF POTENT HEMOSTATIC PRINCIPLE AND HEMOSTATIC PREPARATION THEREFROM
Katsuji Kato, 2 Shibanihonenokinishi-machi, Minato-ku, Tokyo, Japan; Katsuhiro Fukutake, 6708 Kugenuma, Fujisawa-shi, Kanagawa-ken, Japan; Naoto Takei, 128 Koenji-2-chome, Suginami-ku, Tokyo, Japan; and Kenjiro Koyama, 593 Takataminami-cho 2-chome, Toshimaku, Tokyo, Japan
No Drawing. Filed Mar. 23, 1959, Ser. No. 800,936
Claims priority, application Japan, Mar. 25, 1958, 33/7,769, 33/7,770
3 Claims. (Cl. 167—65)

This invention relates to a method for the preparation of a potent hemostatic principle from parenchymatous organs of mammals for example, bovine brain in a form clinically suitable for intravenous injection for the control of bleeding in medical and surgical diseases. It is known that many organs of mammals, particularly, brain, lung kidney, placenta, etc., contain an active hemostatic principle, generally known as tissue thromboplastin. Of these organs, the parenchymatous tissue of brain is provided with this principle in highest concentration. This fact has been known for many years since the publication of Hess (J.A.M.A. 66:558, 1916); and Mann and Hurn devised a method for extracting a hemostatically effective substance from rabbit brain (Am. G. Physiol. 182, 319, 1955). Another method of extraction, utilizing different sources, was also devised and patented by Schoch in Switzerland (No. 242,457, 1946), in Great Britain (No. 606,559, 1948), in Germany (No. 820,787, 1948), in the United States (No. 2,658,020, 1953) and in Japan (No. 239,255, 1958).

Hess recognized in his saline extract the presence of a potent substance, while Schoch, in a detailed description of his product in the above mentioned patents, stated that the active principle is present in the aqueous alcoholic extract of soft tissues such as brain, lung, liver, kidney, etc., after the removal of fatty portion by ether from the dried material. According to Mann and Hurn, a clot-promoting principle was obtained as protein thromboplastin, just as Hess did, by extraction with physiological saline from acetone-treated rabbit brain. In a similar manner, but by further combining the procedure of ether extraction, they obtained a hemostatic principle in the form of lipid thromboplastin containing 2 mg./cc. of lipids. However this substance, extracted only with ether, is naturally crude and not entirely suitable for clinical use because of the dangerous side reactions following intravenous administration.

The present inventors, after completing basic studies on the nature of blood platelets with special reference to their chemical and coagulant properties, have obtained a powerful hemostatic substance, quite comparable in potency to that of platelet lipids, by specifically isolating the alcohol-soluble portion of the ether extract prepared from dehydrated brain powder after condensation under reduced pressure.

The exact and detailed description of our method may now be given. Fresh bovine brain is first thoroughly dehydrated by triturating with at least three changes of cold acetone and then crushed into stable dry powder. Ether extraction of the powder is accomplished in a Soxhlet apparatus and the extract is placed in a refrigerator for 48 hours until a precipitate forms. The supernatant liquid is condensed under reduced pressure in a stream of carbon dioxide or nitrogen gas. After adding alcohol, the mixture is warmed for 20–30 minutes over a water bath and filtered while warm. The inactive residue, which is in soluble in aqueous alcohol, is removed by filtration. The filtrate is again subjected to the process of condensation under reduced pressure in a stream of carbonic acid or nitrogen gas until alcohol is completely removed.

Stated briefly, the characteristics of the present method, different from Schoch's method reviewed above, consists in removing the protein moiety (alcohol-insoluble residue showing anticoagulative action) from the lipoprotein moiety by alcohol treatment of ether extracted lipid thromboplastin of bovine brain.

The method followed in the extraction of the present preparation is depicted graphically in the following diagram.

TABLE 1

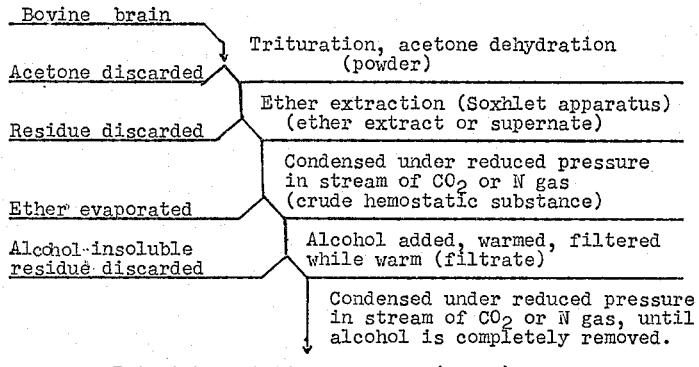

Comparison of the hemostatic principle obtained by the present method (A) and by Mann-Frankday's procedure (B) in regard to chemical analysis is shown in the following Table 2 and the effect of the suspension of the principle in physiological saline solution, regarding the thromboplastin generation tests, is indicated in Table 3.

TABLE 2.—COMPOSITION OF HEMOSTATIC EFFECTIVE SUBSTANCE OBTAINED BY (A) AND BY (B)

| Component | A | B | Alcohol-insoluble residue (A) |
|---|---|---|---|
| Nitrogen, percent | 1.96 | 2.78 | 4.62 |
| Phosphorus, percent | 2.73 | 3.81 | 4.23 |

TABLE 3.—AMOUNT OF THROMBOPLASTIN GENERATION (PERCENT) BY (A) AND BY (B)

| Incubation time (min.) | A | | B | |
|---|---|---|---|---|
| | Platelet-like activity | $BaSO_4$-plasma-like activity | Platelet-like activity | $BaSO_4$-plasma-like activity |
| 1 | 3.0 | 2.0 | 2.0 | 2.0 |
| 2 | 7.5 | 7.0 | 7.0 | 5.0 |
| 3 | 80.0 | 17.6 | 75.8 | 16.0 |
| 4 | 120.0 | 28.0 | 116.0 | 23.0 |
| 5 | 130.0 | 60.0 | 130.0 | 52.0 |

The results of comparative thromboplastin generation tests performed with either addition or replacement of one of the reagents with the present preparation which is prepared by dispersing and suspending the present hemostatic principle in physiological saline solution are shown in Table 4.

TABLE 4.—EFFECTS OF THE PREPARATION ON THE AMOUNT OF THROMBOPLASTIN GENERATION (PERCENT)

| Incubation time (min.) | All reagents normal | Addition to normal reagent | Replaced for platelets | Replaced for $BaSO_4$-plasma | Replaced for serum | Replaced for platelets, $BaSO_4$-plasma | Saline used for platelets |
|---|---|---|---|---|---|---|---|
| 1 | 7.0 | 7.8 | 3.0 | 2.0 | 1.5 | 0.6 | 0.3 |
| 2 | 78.0 | 94.0 | 7.5 | 7.0 | 3.5 | 1.0 | 0.5 |
| 3 | 110.0 | 128.4 | 80.0 | 17.6 | 4.0 | 1.2 | 1.0 |
| 4 | 118.0 | 130.0 | 120.0 | 28.0 | 5.9 | 1.5 | 1.2 |
| 5 | 118.0 | 130.0 | 130.0 | 60.0 | 6.0 | 1.5 | 1.3 |

Thromboplastin generation test is a measure of the amount of thromboplastin formed as a result of the activation of antihemophilic globulin (AHG) under the synergistic actions of platelet factor 3, calcium and plasma thromboplastic factors. The amount of thromboplastin generation may be defined in terms of the clotting time (time required for the formation of colorless solid fibrin) required by the reaction system containing essential clotting factors ($BaSO_4$ plasma, serum and platelet factor isolated from normal blood) to which a definite amount of $CaCl_2$ solution is added (initiating the formation of thromboplastin), the mixture then being incubated in a water bath at 37° C. An aliquot of this mixture is thereafter removed at one minute intervals and the clotting time is measured after adding plasma and calcium chloride.

From the tabulated results (Table 4), it is clear that although thromboplastin generation time is somewhat prolonged when the preparation was used in place of normal platelets, the amount of thromboplastin formed was greater, indicating that the preparation possesses fully the action of platelet factor 3. Furthermore, when the preparation was used in place of $BaSO_4$-plasma, it also exhibited a comparable action though slightly weaker. Moreover, when the preparation was added to the normal reagents, the amount of thromboplastin formation was increased over that with normal reagents used alone, suggesting an augmented effect on the clotting system.

From the facts as above ascertained, the indications for the rational use of this preparation in clinical practice fall broadly into the following conditions:

(1) Disorders arising from platelet disturbances, (2) Diseases caused by the abnormalities of plasma clotting factors, (3) For prevention of excessive bleeding often encountered in major surgery.

Further we have desired to make the present hemostatic active substance intravenously injectable. However a physiological saline solution in which said substance is dispersed and suspended has disadvantages that the liquids in the solution coagulate on heating, so that said solution cannot be used as it is.

Then, we have made an entirely novel attempt to add one or more of non-ionic surface-active agents, for example, polyoxyethylene sorbitan monolaurate of anhydrosorbital series to the suspension of the hemostatic active substance in physiological saline solution. By this procedure we have succeeded in dispersing and uniformly suspending the hemostatic active substance consisting of lipid principle in a size of less than that of red blood corpuscle.

The methods according to the present invention will be described below in more detail.

A preparation in which the lipids, that is hemostatically active substance extracted from fresh, soft tissues and internal organs of various kinds of animals are suspended in a physiological saline solution, has disadvantages to decline in its activity and cause a coagulation of the suspended particles when it has been stored for a long period and similarly also when it is sterilized by heating, so that it cannot be employed for intravenous administration.

As a result of many investigations, we have now succeeded in making the hemostatically active substance uniformly dispersed in the form of particles with a size smaller than 3.5 microns by means of addition of a proper non-ionic surface-active agent such as, for example, polyoxyethylene sorbitan monolaurate, polyoxyethylene lauryl alcohols, polyoxyethylene stearate, sorbitan monolaurate, sorbitan monostearate and polyoxyethylene monostearate, without being accompanied by any coagulation of the particles even after sterilization and storage.

Since the preparation so obtained contains the hemostatically active substance in a size of smaller than one-half that of the red blood corpuscles (about 7 microns), said preparation can be intravenously administered without any difficulty. However, a hemostatic preparation not containing any non-ionic surface-active agent exhibits a considerable coagulation of the lipids and becomes unsuitable for use when it is sterilized by heating under the same conditions, and besides it cannot be preserved for a long period even in a cool and dark place, so that the useful life of the preparation is very limited. Furthermore, we have found that the addition of a small amount of ascorbic acid enables the preparation to be preserved for a longer period of time in addition to its anti-oxidation effect.

Three samples A, B and C were separately placed and storaged in an incubator at 37° C., in room temperature of 20–30° C. and in a refrigerator at 4–6° C., respectively, and effect of the time-elapse on the preparations was observed based upon the thromboplastin generation test. The results are shown in Tables 5 and 6.

TABLE 5.—EFFECT OF THE TIME-ELAPSE ON SAMPLES BASED UPON THROMBOPLASTIN GENERATION TEST

[The present preparation was used instead of blood platelet (placed and stored in incubator at 37° C.)]

| | | | | | Clotting Time (seconds) | | | | | | | | |
|---|---|---|---|---|---|---|---|---|---|---|---|---|---|
| Days | | 10 | 20 | 30 | 40 | 50 | 60 | 70 | 80 | 90 | 100 | 120 | 140 |
| A | Standing Time (min.): | | | | | | | | | | | | |
| | 1 | 60.0 | 65.0 | 90.0 | 95.0 | | | | | | | | |
| | 2 | 40.0 | 44.0 | 75.0 | 94.0 | | | | | | | | |
| | 3 | 25.0 | 28.0 | 75.0 | 96.5 | | | | | | | | |
| | 4 | 15.5 | 20.0 | 64.5 | 85.7 | | | | | | | | |
| | 5 | 10.0 | 15.0 | 48.0 | 90.6 | | | | | | | | |
| | 6 | 8.5 | 10.8 | 28.0 | 90.0 | | | | | | | | |
| | 7 | 8.2 | 8.0 | 20.0 | 85.0 | | | | | | | | |
| | 8 | 8.2 | 8.0 | 15.8 | 85.2 | | | | | | | | |
| | 9 | | | 15.0 | 85.0 | | | | | | | | |
| B | Standing Time (min.): | | | | | | | | | | | | |
| | 1 | 59.8 | 59.0 | 59.5 | 59.2 | 59.0 | 60.0 | 60.0 | 65.0 | 85.0 | 93.7 | | |
| | 2 | 37.1 | 36.5 | 40.0 | 36.5 | 40.2 | 39.5 | 40.2 | 50.7 | 70.4 | 94.0 | | |
| | 3 | 11.7 | 14.0 | 13.5 | 11.5 | 15.5 | 18.5 | 20.5 | 35.4 | 70.0 | 85.7 | | |
| | 4 | 8.5 | 9.0 | 8.8 | 8.4 | 9.8 | 10.0 | 13.5 | 20.0 | 60.5 | 86.0 | | |
| | 5 | 8.0 | 8.1 | 8.2 | 8.0 | 8.2 | 8.0 | 9.4 | 10.0 | 38.5 | 86.0 | | |
| | 6 | 8.0 | 8.1 | 8.2 | 8.0 | 8.2 | 8.0 | 9.0 | 9.0 | 20.0 | 82.3 | | |
| | 7 | | | | | | | 8.5 | 8.5 | 19.5 | 84.0 | | |
| | 8 | | | | | | | 8.0 | 8.2 | 11.0 | 84.0 | | |
| | 9 | | | | | | | 8.0 | 8.2 | 9.5 | 83.5 | | |
| C | Standing Time (min.): | | | | | | | | | | | | |
| | 1 | 60.0 | 59.0 | 59.0 | 62.0 | 60.0 | 60.5 | 59.0 | 62.0 | 65.5 | 70.5 | 94.5 | 95.0 |
| | 2 | 38.5 | 35.8 | 40.0 | 41.0 | 37.0 | 38.0 | 40.0 | 42.5 | 40.0 | 50.0 | 80.0 | 85.0 |
| | 3 | 14.5 | 14.0 | 16.5 | 18.0 | 15.0 | 14.5 | 18.5 | 20.0 | 22.4 | 35.8 | 60.5 | 85.0 |
| | 4 | 9.0 | 8.5 | 9.2 | 9.0 | 8.4 | 9.0 | 8.2 | 9.5 | 10.0 | 20.7 | 42.8 | 88.5 |
| | 5 | 8.1 | 8.0 | 8.2 | 8.1 | 8.0 | 8.1 | 8.0 | 8.2 | 8.5 | 15.0 | 30.4 | 86.8 |
| | 6 | 8.1 | 8.0 | 8.2 | 8.1 | 8.0 | 8.1 | 8.0 | 8.2 | 8.1 | 9.5 | 25.0 | 90.0 |
| | 7 | | | | | | | | | 8.1 | 9.0 | 20.0 | 90.5 |
| | 8 | | | | | | | | | | 9.0 | 19.5 | 89.0 |
| | 9 | | | | | | | | | | | 10.0 | 88.8 |
| | 10 | | | | | | | | | | | 9.0 | 89.5 |

TABLE 6.—EFFECT OF THE TIME-ELAPSE ON SAMPLES BASED UPON THROMBOPLASTIN GENERATION TEST

[The present preparation was used instead of blood platelet (placed and stored at room temperature of 20–30° C.)]

| | | | | | Clotting Time (seconds) | | | | | |
|---|---|---|---|---|---|---|---|---|---|---|
| Days | | 30 | 60 | 90 | 120 | 150 | 200 | 250 | 300 | 350 | 400–500 |
| A | Standing Time (min.): | | | | | | | | | | |
| | 1 | 60.0 | 62.0 | 65.0 | 65.0 | 85.0 | 90.0 | | | | |
| | 2 | 40.0 | 42.5 | 45.0 | 50.8 | 84.3 | 85.0 | | | | |
| | 3 | 15.0 | 18.2 | 32.5 | 37.8 | 65.0 | 87.8 | | | | |
| | 4 | 8.8 | 9.5 | 15.0 | 20.0 | 40.0 | 88.6 | | | | |
| | 5 | 8.0 | 8.2 | 9.0 | 15.8 | 32.0 | 85.7 | | | | |
| | 6 | 8.0 | 8.0 | 8.0 | 12.0 | 20.0 | 88.0 | | | | |
| | 7 | | 8.0 | 8.0 | 9.5 | 15.0 | 87.5 | | | | |
| | 8 | | | | 8.2 | 12.5 | 87.5 | | | | |
| | 9 | | | | 8.2 | 9.5 | 85.0 | | | | |
| B | Standing Time (min.): | | | | | | | | | | |
| | 1 | 59.8 | 59.5 | 59.8 | 58.8 | 60.0 | 62.0 | 60.2 | 59.5 | 70.5 | 69.0–70.0 |
| | 2 | 37.6 | 36.0 | 35.5 | 34.0 | 36.5 | 38.0 | 40.0 | 35.0 | 60.0 | 54.5–65.0 |
| | 3 | 12.7 | 13.5 | 12.0 | 14.0 | 16.5 | 13.2 | 15.2 | 14.0 | 42.5 | 35.5–40.0 |
| | 4 | 9.0 | 9.5 | 9.0 | 8.8 | 9.2 | 8.5 | 10.0 | 8.6 | 30.5 | 25.0–30.0 |
| | 5 | 8.2 | 8.2 | 8.1 | 8.0 | 8.2 | 7.8 | 8.1 | 8.0 | 19.2 | 19.0–25.8 |
| | 6 | 8.0 | 8.0 | 8.1 | 8.0 | 8.2 | 7.8 | 8.1 | 8.0 | 10.0 | 13.5–20.0 |
| | 7 | | | | | | | | | 9.1 | 9.8–18.5 |
| | 8 | | | | | | | | | 8.2 | 8.5–10.0 |
| | 9 | | | | | | | | | 8.2 | 8.2–10.0 |
| C | Standing Time (min.): | | | | | | | | | | |
| | 1 | 58.5 | 59.0 | 60.0 | 59.2 | 59.0 | 60.5 | 62.0 | 61.0 | 59.5 | 62.0–70.0 |
| | 2 | 39.2 | 38.0 | 40.0 | 35.0 | 36.0 | 38.8 | 40.2 | 39.5 | 37.2 | 41.5–62.0 |
| | 3 | 10.6 | 13.5 | 15.0 | 11.5 | 10.5 | 14.4 | 16.6 | 18.0 | 12.5 | 15.2–40.0 |
| | 4 | 8.2 | 9.0 | 10.2 | 9.5 | 8.5 | 10.6 | 15.4 | 13.5 | 9.4 | 10.5–25.0 |
| | 5 | 8.0 | 8.2 | 8.2 | 8.1 | 8.0 | 8.2 | 9.2 | 8.0 | 8.1 | 8.0–9.8 |
| | 6 | 8.0 | 8.2 | 8.8 | 8.1 | 8.0 | 8.2 | 8.0 | 8.0 | 8.1 | 8.0–8.2 |
| | 7 | | | | | | | | | | 8.2 |
| | 8 | | | | | | | | | | |
| | 9 | | | | | | | | | | |
| | 10 | | | | | | | | | | |

Sample A was a control preparation containing neither non-ionic surface-active agent nor ascorbic acid.

Sample B was a prepared according to the method of the invention, containing a non-ionic surface-active agent, polyoxyethylene sorbitan monolaurate, but not ascorbic acid.

Sample C was prepared according to the method of the invention, containing both of a non-ionic surface-active agent, polyoxyethylene sorbitan monolaurate and ascorbic acid.

Thus, as can be seen from Table 5, of the preparations which were placed and stored in the incubator at 37° C., the sample A, i.e. the preparation containing neither non-ionic surface-active agent nor ascorbic acid showed a diminution of activity from about the 30th day. The sample B, i.e. the preparation containing a non-ionic surface-active agent polyoxyethylene sorbitan monolaurate alone but not ascorbic acid could be preserved for a much longer period of time than the sample A, showed a little thromboplastin-generation or a prolonged clotting time from about the 70th but maintained a potent activity for a further longer period of time than the sample A.

Further, the sample C, i.e. the preparation containing both of a non-ionic surface-active agent, polyoxyethylene sorbitan monolaurate and ascorbic acid had a much increased stability and could be preserved for a considerably longer period of time than the sample B.

As can be seen from Table 6, the preparations which were placed and storaged at room temperature of 20–30° C., the sample A, i.e. the preparation containing neither non-ionic surface-active agent nor ascorbic acid showed a diminution of activity from about the 120th day. The sample B, i.e. the preparation containing a non-ionic surface-active agent, polyoxyethylene sorbitan monolaurate alone but not ascorbic acid could be preserved for a much longer period of time than the sample A and showed a little thromboplastin-generation or a prolonged clotting time from about the 500th day.

Sample C, however, i.e. the preparation containing both of a non-ionic surface-active agent polyethylene sorbitan monolaurate and ascorbic acid had a much greater stability than the sample B and did not show any diminution of activity even during storage for 500 days. No other physical changes such as coagulation of the particles etc. occurred. Needless to say, none of these physical changes have been found in the preparations which were stored in a refrigerator (4–6° C.) and at room temperature.

Therefore, the preparations will be preserved for a long period of time, maintaining their improved stability, provided they are kept in a cold, dark place.

As stated above, according to the invention, a new intravenously injectable hemostatic preparation having excellent properties can be thus obtained.

Characteristics of the preparation obtained according to the method of the invention will be described below. Owing to the addition of a suitable non-ionic surface-active agent, the active ingredient in the preparation, the lipids are allowed to be dispersed and suspended in the physiological saline solution in the form of spherical particles of less than 3.5 microns in diameter, i.e. of a size smaller than that of the normal red blood corpuscle and no coagulation of lipids takes place even on heating and during the passage of time, so that there is no need for concern regarding adverse side effects of the preparation upon its intravenous administration. Furthermore, even on heating in an autoclave (under a pressure of 15 p.s.i.) for 20 minutes, there cannot be observed any substantial diminution of activity. In view of the foregoing, it is possible to provide a satisfactory sterilization of the preparation. The pH of the preparation of the invention is 5.1. Since an optimal pH presenting a maximum hemostatic activity is in a range of 6.9–8.3, the pH of the preparation assumes its optimal value in the blood after its intravenous administration. However, the activity of the preparation disappears entirely in strong acid and alkaline media.

As the present preparation always gives negative results to both biuret reaction and tetrabromphenolphthalein (TBP) reaction, it contains no protein, either free or bound. Accordingly the preparation presents no danger of adverse side effects such as "anaphylactic shock" and others after its intravenous administration. The chemical analysis of the preparation proved the nitrogen content to be 0.098 mg./cc. and the phosphorous content 0.136 mg./cc.

The preparation has no toxicity, hence $LD_{50}$ cannot be calculated. Pyrogen tests, conducted according to the requirements for lyophilized plasma, are negative and no side-effect can be obtained in guinea pigs by intraperitoneal injection.

Any appearance of antibody in blood plasma cannot be observed after repeated intravenous administration of the preparation or repeated intramuscular injections of the aluminum hydroxide-adsorbed fluid in rabbits.

Moreover, an extension or a shortening of the available period of the hemostatic activity can be optionally adjusted, depending upon the quantity of non-ionic surface-active agent added.

The optimal concentration at which this preparation exhibits its maximum clotting action in vitro ranges from 0.004–0.04 mg./cc. and concentrations higher than this range are rather anticoagulative in effect.

These chemical and physiological characteristics of this hemostatic, eminently suitable for intravenous administration and free from any dangers as to thrombus or embolus formation, are the ideal properties which, the method here devised has succeeded in achieving.

The method of the present invention will be illustrated below with reference to the examples.

EXAMPLE 1

Fresh bovine brain, after completely ridding of blood vessels and meninges, is triturated into a smooth paste and several times the volume of acetone cooled to 0° C. are added. The mixture is carefully triturated and, after standing for a short while, acetone is decanted off. This procedure is repeated several times until the mass becomes non-viscous and granular in appearance. Acetone is finally and completely removed by means of a suction pump, and then the substance is converted into a dry powder under reduced temperature.

For each 1000 mg. of this dry powder 100 cc. of ether are added and extraction carried on for 4 hours in Soxhlet apparatus. In this process the complex lipid possessing a hemostatic activity is specifically extracted. This extract contains the complex lipid in the amount of 250 mg. The extract is condensed under reduced pressure in a stream of nitrogen gas, and for each 100 cc. of the extract 50 cc. of alcohol are added and warmed for 20 minutes over a water bath. By filtering the resulting product while warm the alcohol-insoluble residue, which is inactive, is removed and discarded as an impurity. The alcoholic filtrate is again condensed in a stream of nitrogen gas, to such an extent that alcohol is completely removed. Yield of the complex lipid is 220 mg.

EXAMPLE 2

100 cc. of the ether extract, obtained by the same procedure as employed in Example 1, is allowed to stand for 8 hours in the refrigerator at 4° C. The supernate which separates from the precipitate is condensed under reduced pressure in a stream of nitrogen gas. After adding 50 cc. of alcohol and warming for 20 minutes over a water bath, the alcohol-insoluble impurities are removed by filtration while warm. The alcoholic filtrate is again subjected to the process of complete condensation in a stream of nitrogen gas. It is then dissolved in 100 cc. of ether. The content of complex lipid in this ether extract is 120 mg. A powerful hemostatic preparation in suspension is obtained when the ether extract is dispersed in physiological saline and ether is finally evaporated off.

EXAMPLE 3

For each 1000 mg. of dry powder of fresh bovine brain dehydrated with acetone 100 cc. of ether are added and extraction carried on for 4 hours in Soxhlet apparatus over a water bath. This etherial extract contains the lipids in the amount of 250 mg. The product resulted from the purification by means of ether-alcohol treatment contains the lipids in the amount of 220 mg.

To 44 cc. of a physiological saline solution containing 35.2 mg. of polyoxyethylene sorbitan monolaurate (Tween 20, produced by Atlas Powder Co.) and 44 mg. of ascorbic acid, 220 mg. of the lipids are added and thoroughly dispersed and suspended with stirring.

The lipid content in this suspension in the physiological saline solution is 5 mg./cc. In each dark brown ampullae, 5 cc. of the suspension having the lipids dispersed and suspended completely therein is charged and nitrogen gas is also enclosed therein. The ampullae are closed by fusing in a conventional manner and heated at 100° C. for 40 minutes to effect the sterilization. Thus, the commercial product was obtained.

EXAMPLE 4

Other non-ionic surface-active agent, for example, polyoxyethylene lauryl alcohols can be similarly employed as in Example 3 to produce the suspension in which the lipids is uniformly dispersed and suspended.

44 mg. of said polyoxyethylene lauryl alcohol (Brij 35, produced by Atlas Powder Co.) are added to 44 cc. of a physiological saline solution and an etherial extract containing the lipids of the hemostatically active substance are added thereto, agitated, dispersed and suspended therein. The ether is evaporated off by warming this as 50° C. on a water bath. Thereby the lipids are able to be uniformly dispersed in the suspension without any coagulation of the particles, even on heating, sterilization and storage.

EXAMPLE 5

Similarly, another non-ionic surface-active agent polyoxyethylene stearate (Myrj 51, produced by Atlas Powder Co.) also can be used as in Example 3 to produce the suspension in which the hemostatically active substance is uniformly dispersed and suspended.

EXAMPLE 6

Other non-ionic surface-active agent such as, for example, sorbitan monolaurate may be employed similarly as in Example 3 in order to make the uniform dispersion and suspension, if it is used in admixture with a non-ionic surface-active agent such as polyoxyethylene sorbitan monolaurate.

30.8 mg. of a mixture of 45 parts of sorbitan monostearate (Span 60, produced by Atlas Powder Co.) and 55 parts of polyoxyethylene monostearate (Tween 60, produced by Atlas Powder Co.) are added to 44 cc. of a physiological saline solution containing 35 mg. of ascorbic acid. 100 cc. of an etherial extract containing the lipids of the hemostatically active substance are added thereto as usual, agitated, dispersed and suspended therein. The ether is evaporated off by warming the suspension at 50° C. on a water bath. Thus, there was prepared a stabilized hemostatic preparation in which the lipids are uniformly dispersed similarly as in Example 3 without any coagulation of the particles even on heating, sterilization and storage.

The action of the stabilized preparation resembles that of platelet factor 3, of BaSO$_4$ treated plasma, of thrombin synergist or of clot retraction effect.

Clinically a favourable effect was noted in all of the 5 cases of idiopathic thrombocytopenic purpura. Hemostatic improvement was most remarkable in clotting time, serum prothrombin activity and clot retraction. Good effects were also noted on bleeding time and petechial manifestions. Satisfactory amelioration in the bleeding tendency accompanying aplastic anemia (4 cases) and leukemia (3 cases) was clinically obtained.

From these results it may be stated that lipid thromboplastin may be applicable as a substitute for platelet transfusion in the treatment of hemorrhagic diathesis chiefly arrising from platelet defects.

Lipid thromboplastin was also used in 12 cases of hemophilia and hemophiliod states, and the shortening of clotting time was noted in 10 of these cases.

When the preparation was applied in the control of hemoptysis in tuberculosis and pulmonary gangrene (21 cases), the hemostatic effects were dramatic in all instances and clinical improvement was remarkable.

The hemostatic efficacy in surgical cases was tested in pneumonectomy in which the operative stress was considered to be at its maximum and the amount of blood loss was likely to be excessive. In 10 such cases the application of the preparation resulted in a marked reduction of bleeding in contrast to the untreated cases.

As stated above, the present preparation simulates almost exactly the action of platelet factor 3 and is entirely free from any dangerous side-reaction, making it a safe and satisfactory substitute for platelet transfusion.

What we claim is:

1. A hemostatic agent suitable for intravenous injection, said agent being produced by the process which comprises the steps of: triturating fresh bovine brain tissue, free from blood vessels and meninges, with acetone, separating the acetone from said triturated tissue whereby a dry powder is formed, extracting fat in said dry powder with ether whereby the lipid possessing a hemostatic activity is isolated, evaporating ether under reduced pressure in a stream of an inert gas, adding alcohol, warming the mixture, filtering the product while warm in order to remove the alcohol insoluble residue, evaporating the alcoholic filtrate in a stream of an inert gas to dryness adding the thereby produced material to a physiological saline solution containing a non-ionic surface active agent.

2. The hemostatic agent of claim 1 wherein the non-ionic surface active agent is selected from the group consisting of polyoxyethylene sorbitan monolaurate, polyoxyethylene lauryl alcohol, polyoxyethylene stearate, polyoxyethylene monostearate, sorbitan monolaurate and sorbitan monostearate.

3. The hemostatic agent according to claim 1, wherein said physiological saline solution additionally contains ascorbic acid.

References Cited by the Examiner

UNITED STATES PATENTS

| | | | |
|---|---|---|---|
| 2,143,088 | 1/1939 | Rockwell | 167—58.1 |
| 2,185,969 | 1/1940 | Schultz | 167—65 |
| 2,527,579 | 10/1950 | Schoch | 167—74 |
| 2,619,447 | 11/1952 | Malcolm | 167—58.1 |
| 2,658,020 | 11/1953 | Schoch | 167—74 |
| 2,721,161 | 10/1955 | Maiese | 167—81 |

OTHER REFERENCES

Reddish: Antiseptics, Disinfectants, Fungicides, and Chem. and Phys. Sterilization, Lea and Febiger, Philadelphia, 1954, pp. 369, 591–593.

Tocantins: The Coagulation of Blood, 1955, Grave and Stratton, N.Y., pp. 73–74, 178–179.

Hasselbach: Fortschr. Therap. #7, Thur Deut-med Worchschr., vol. 62, p. 282 (1936).

JAMA, November 15, 1941, pp. 1692–1695.

Chargaff: J. Biol. Chem., vol. 116, 1936, pp. 237–251.

Chargaff: J. Biol. Chem., vol. 155, 1944, pp 387–399.

Folch: J. Biol. Chem., vol. 146, 1942, pp. 35–44.

Folch: J. Biol. Chem., vol. 177, 1949, pp 497–499

Gagyi: Kin-Wochschr., 15, 190 (1936), #6.

Engelkes: Lancet, vol. 229, p. 1285 (1935).

The Lancet, 271: 6936, Aug. 4, 1956, pp. 232–234.

Spalton: Pharm. Emulsions, The Chemist & Druggist, 2nd ed., London, 1956, pp. 70–72, 83–85.

Campbell: PSEBM, 83: May 1, 1953, pp. 105, 106.

Kato: Shinyaku to Rinsho, vol. 5, 1956, 11–17, 93–101, 186–92.

LEWIS GOTTS, *Primary Examiner.*

WILLIAM B. KNIGHT, MORRIS O. WOLK, FRANK CACCIAPAGHA, JULIAN S. LEVITT, RICHARD HUFF, A. P. FAGELSON, *Examiners.*